United States Patent [19]

Landers et al.

[11] 4,434,830

[45] Mar. 6, 1984

[54] PNEUMATIC TIRE

[75] Inventors: Samuel P. Landers, Uniontown; William E. Egan, Tallmadge, both of Ohio

[73] Assignee: The Goodyear Tire & Rubber Company, Akron, Ohio

[21] Appl. No.: 473,840

[22] Filed: Mar. 9, 1983

[51] Int. Cl.³ .................... B60C 11/00; B60C 13/00; B60C 15/00

[52] U.S. Cl. .................... 152/209 R; 152/330 D; 152/353 C; 152/356 R; 152/361 R; 152/378 R; 301/37 TC

[58] Field of Search .......... 152/330 R, 330 D, 352 R, 152/353 R, 353 C, 354 R, 354 RB, 356 R, 361 R, 378 W, 379.3, 386, 393; 428/35, 36; 244/103

[56] References Cited

U.S. PATENT DOCUMENTS

| | | | |
|---|---|---|---|
| 1,903,574 | 4/1933 | Shoemaker | 152/352 R |
| 2,005,626 | 6/1935 | Maranville | 152/352 R |
| 2,052,130 | 8/1936 | Cassady | 152/352 R |
| 2,822,016 | 2/1958 | Billingsley | 152/352 R |
| 3,515,196 | 6/1970 | Floria | 152/352 R |
| 4,088,168 | 5/1978 | Boileau et al. | 152/352 R |
| 4,203,480 | 5/1980 | Peter et al. | 152/352 R |
| 4,282,918 | 8/1981 | Tomoda et al. | 152/353 C |
| 4,349,061 | 9/1982 | Hirakawa et al. | 152/209 R |

*Primary Examiner*—William A. Powell
*Assistant Examiner*—Thomas Bokan
*Attorney, Agent, or Firm*—L. R. Drayer

[57] ABSTRACT

A pneumatic tire having better aerodynamic characteristics than conventionally shaped tires is disclosed. A radial cross-section of the tire has an external contour on each side of its mid-circumferential plane, exclusive of indicia on the sidewalls or traction elements of the tread portion, that extends continuously axially outwardly and radially inwardly to the point where the external surface of each sidewall intersects a radially extending line, that is tangent to the axially outer edge of a retaining flange of a rim that the tire is mountable upon, with a portion of the external contour on each side of the mid-circumferential plane at least approximating an ellipse. The external surfaces of the sidewalls do not extend more than 2.54 millimeters (0.1 inch) axially outwardly of the axially outer edge of the retaining flange of the rim at any location.

15 Claims, 6 Drawing Figures

PNEUMATIC TIRE

BACKGROUND OF THE INVENTION

The present invention relates to a pneumatic tire having better aerodynamic characteristics than conventionally-shaped tires.

Wind tunnel tests have indicated that at a steady speed of 100 kilometers per hour air drag accounts for about 75 percent of the fuel consumption of a typical passenger automobile, with conventionally-shaped tires mounted on the automobile contributing about 10 percent of the total air drag on the automobile. The external contour of a radial cross-section of a conventionally shaped tire mounted on a rim and not subjected to a load has a maximum diameter at the mid-circumferential centerplane of the tire, a maximum axial width that is greater than the axial distance between the retaining flanges of the rim at a location somewhere between the rim and the maximum diameter of the tire, and an axial width adjacent to the retaining flanges of the rim that is about 70 to 85 percent less than the tire's maximum axial width.

As used herein and in the appended claims: "axial" and "axially" refer to directions that are parallel to the axis of rotation of a tire, or tire and rim assembly; "radial" and "radially" refer to directions that are perpendicular to the axis of rotation of a tire, or tire and rim assembly; and "the mid-circumferential centerplane" of a tire is a plane that is perpendicular to the axis of rotation of a tire, or tire and rim assembly, and is located midway between the external surfaces of the sidewalls of a tire at its maximum axial width exclusive of ornamentation or indicia.

The aerodynamic characteristics of a pneumatic tire may be improved by providing the tire with an external contour which accelerates the flow of air smoothly from the mid-circumferential centerplane to the junction of the tire sidewall with the flanges of a rim that the tire is mounted upon. In order to attain such a smooth acceleration of the air flow, the external contour of the tire should not present any abrupt or sharp changes in axial direction. The significant difference between the axial width of a conventionally-shaped tire at the rim flanges and at its point of maximum axial width may result in air flow separation, turbulence, and drag as the flow of air attempts to follow the contour of the tire sidewall.

The desirability of streamlining tires and rims for use on aircraft was recognized several years ago, with such tires being described, for example, in U.S. Pat. Nos. 2,005,626 and 2,052,130. The aircraft tire described in U.S. Pat. No. 2,005,626 is a low pressure tire which is intended to have a streamlined shape and minimum air flow resistance in flight only, since it deforms to increase in ground-contacting area when the tire is under load. U.S. Pat. No. 2,052,130 discloses a tire having a cross-sectional profile substantially conforming to a segment of an ellipse, and as a result it presents a narrow surface for engagement with the ground, in comparison with the overall width of the tire, so that the traction and handling characteristics of such a tire on a surface vehicle would not be very satisfactory by today's standards. However, a tire according to the present invention not only has improved aerodynamic characteristics, but also meets the handling and traction requirements of modern surface vehicles.

BRIEF DESCRIPTION OF THE DRAWING

The following description of the invention may be better understood by referring to the annexed drawing, wherein.

DETAILED DESCRIPTION OF THE INVENTION

Figure 1:
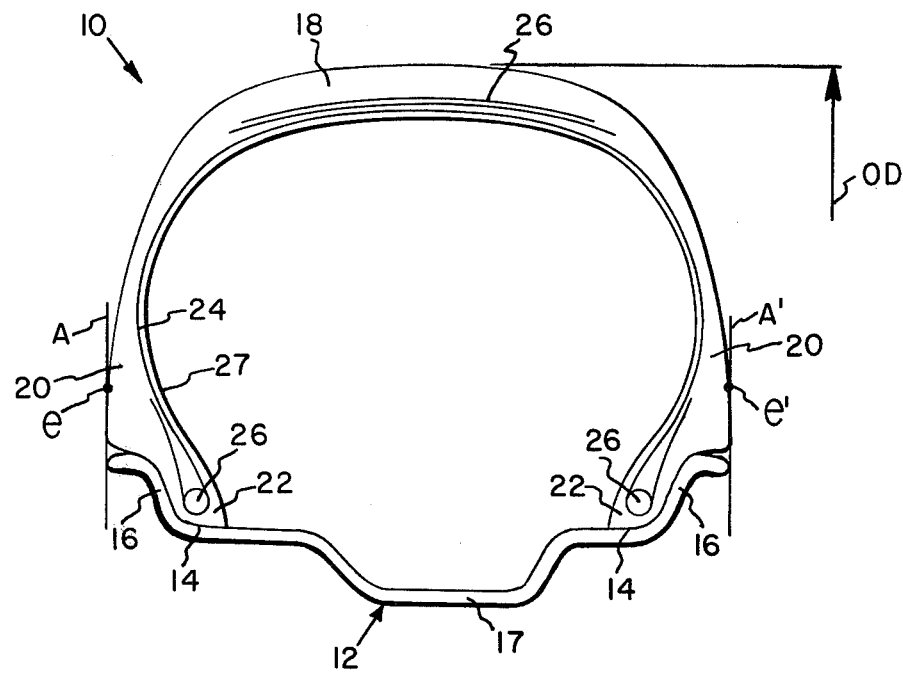
FIG. 1 is a radial cross-sectional view of a tire according to the invention mounted upon a rim.

Referring first to FIG. 1, there is shown a radial cross-sectional view of a pneumatic tire 10 mounted upon a rim 12 to form the assembly of a pneumatic tire and a rim. The rim comprises a pair of axially spaced apart annular mounting surfaces 14, with a retaining flange 16 adjacent to each of the annular mounting surfaces. The annular mounting surfaces are connected to one another by a rim base 17, which may have an annular well to facilitate the mounting of a tire on the rim. Each of the retaining flanges 16 extends radially outwardly from an annular mounting surface 14, and is bent axially outwardly at its radially outermost extent. The annular mounting surfaces may be inclined at an angle of up to about 15 degrees with respect to the axis of rotation of the assembly, and have a nominal diameter that has been selected to mate with the bead portions of a tire that the rim is intended to be assembled with. It is understood that a tire according to the invention may be mounted upon any correspondingly sized rim regardless of whether the rim is of the single piece or multi-piece variety. However, one of the advantages of a tire or tire and rim assembly according to the invention is that the tire is mountable upon a rim of a type that is already widely available, such as is illustrated in FIG. 1, although for reasons that will become apparent later in the specification, it may be necessary to use a larger diameter rim than is usually used on the vehicle.

A pneumatic tire 10 according to the invention comprises a circumferentially extending tread portion 18 with a sidewall 20 extending radially inwardly from each axial edge of the tread portion to an annular bead portion 22. The tread portion and sidewalls are comprised of a suitable elastomeric substance, such as a natural or synthetic rubber, selected in accordance with engineering standards that are widely known in the tire art. While it is understood that it is desirable to provide the tread portion of a pneumatic tire according to the invention with traction elements, such as ribs or buttons, such traction elements are not shown in the figures of the drawing so that the invention may be more clearly illustrated. It is preferred that any indicia on the sidewalls be recessed about 0.12 millimeters (0.03 inches) rather than protruding from the tire sidewall in the usual manner. Each bead portion 22 of the tire has a radially inner surface which is inclined at substantially the same angle with respect to the axis of rotation of the tire or tire and rim assembly as the annular mounting surfaces 14 of the rim upon which the tire is intended to be mounted with each bead portion adjacent to the respective retaining flange 16.

A pneumatic tire 10 according to the invention may be further comprised of one or more circumferentially extending carcass-reinforcing plies 24 located radially inwardly of the tread portion 18 and having axial edges that are anchored about substantially inextensible bead cores 26 located in the bead portions 22. For the purpose of example only, the tire 10 shown in FIG. 1 has only a single carcass-reinforcing ply 24 which is comprised of parallel reinforcing elements extending in a substantially radial direction so that the tire 10 is of the variety commonly referred to as a radial ply tire. As used herein, a "radial ply tire" has a carcass-reinforcing ply comprised of parallel reinforcing elements which are oriented at an angle of between 75 degrees to 90 degrees with respect to the mid-circumferential plane of the tire. The reinforcing elements of the carcass ply may be any suitable material, such as polyester, rayon, or glass. An air impermeable innerliner 27 extends about the inside periphery of the tire. An annular tread-reinforcing structure 26 may be circumferentially disposed between the tread portion 18 and the carcass-reinforcing ply 24. For example, in a radial ply tire the tread-reinforcing structure may be comprised of a plurality of belt plies having parallel reinforcing elements that are disposed at an angle with respect to the mid-circumferential plane of the tire that is lower than the angle made by the reinforcing elements of the carcass ply with the mid-circumferential plane of the tire. The reinforcing elements of the belt plies may be any suitable material, such as metallic cables or aramid. Most preferably, a pneumatic tire according to the invention is a radial ply tire in which the reinforcing elements of the carcass-reinforcing ply assume what is known in the art as a natural shape or equilibrium profile from the axially outer edges of the tread-reinforcing structure to the bead portions. The concept of natural shape is well known in the tire art, and has been described, for example, in MATHEMATICS UNDERLYING THE DESIGN OF PNEUMATIC TIRES, by John F. Purdy, published in 1963. However, it is understood that a pneumatic tire in accordance within the broad scope of the present invention may also be of the bias-ply or bias-belted varieties that are widely known in the tire art, or may even be made devoid of reinforcing elements by molding a tire of polymeric material.

A pneumatic tire according to the present invention has improved aerodynamic characteristics over conventionally-shaped tires used on surface vehicles due to the external contour of the tire when it is mounted upon a rim, that it is designed to be mounted upon, and inflated to its design inflation pressure. The design inflation pressure of a pneumatic tire is that amount of pressure exerted by a gas used to inflate the tire to support the load the tire is designed to carry under normal operating conditions.

The tread portion 18 of a pneumatic tire according to the invention has a maximum outside diameter OD at the mid-circumferential plane of the tire. For example, a size P155/75-16 tire according to the invention that is intended to be mounted upon a rim having annular mounting surfaces with nominal diameters of 40.64 centimeters (16 inches) may have a tread portion with a maximum outside diameter OD of 63.50 centimeters (25 inches). A P155/75-16 tire according to the invention may have a maximum outside diameter that is substantially the same as that of a conventionally shaped P185/75-14 tire that is mounted on a rim with annular mounting surfaces having a nominal diameter of 35.56 centimeters (14 inches). Therefore, if a vehicle is being equipped with tires according to the invention, it is preferable to mount the tires upon rims of a larger diameter than those that would be used on the same vehicle equipped with conventionally shaped tires.

A radial cross-section of the portion of a tire 10 according to the invention that is disposed radially outwardly of the retaining flanges 16 of a rim when the tire is mounted upon a correspondingly sized rim and inflated to its design inflation pressure, but not subjected to a load, has an external contour on each side of the mid-circumferential plane of the tire, exclusive of indicia on the sidewalls or traction elements of the tread portion, that extends continously axially outwardly and radially inwardly to the point of intersection $e, e^1$ of the external surface of each sidewall 20 with a radially extending plane $A, A^1$, that is tangent to the axially outer edge of the respective retaining flange 16, with the tread portion having a first radius of curvature and a portion of the external contour of each sidewall on each side of the mid-circumferential plane at least approximating the curvature of an ellipse. If the points $e, e^1$ of intersection of the external surface of each sidewall with a radially extending plane $A, A^1$, that is tangent to the axially outer edge of the respective retaining flange, are not located very close to the radially outer extent of the retaining flanges of the rim, then the external surface of each of the sidewalls of the tire extends radially inwardly from the respective point of intersection $e, e^1$ to a point that is very close to the radially outer extent of the respective retaining flange of the rim in a direction that varies no greater than 15 degrees from the radial direction.

As used herein and in the appended claims, "very close" refers to a distance of no greater than two percent of the axial distance between the axially outer extends of the retaining flange of the correspondingly sized rim. However, in no instance should any point on the external surface of a sidewall of a tire according to the invention be disposed axially outwardly of the axially outer edge of the respective retaining flange, when the tire is mounted upon a correspondingly sized rim and inflated to its design inflation pressure but not subjected to a load, a distance greater than two percent of the axial distance between the axially outer extents of the retaining flanges of the correspondingly sized rim. For example if a tire is mounted upon a rim having an axial distance of 15.75 centimeters (6.2 inches) between the axially outer extents of the retaining flanges, no point on a sidewall should extend more than 2.54 millimeters (0.1 inch) axially outwardly of the respective retaining flange. Most preferably, no point on the external surface of either sidewall extends axially outwardly of the axially outer extent of the respective retaining flange of said rim.

Figure 2:
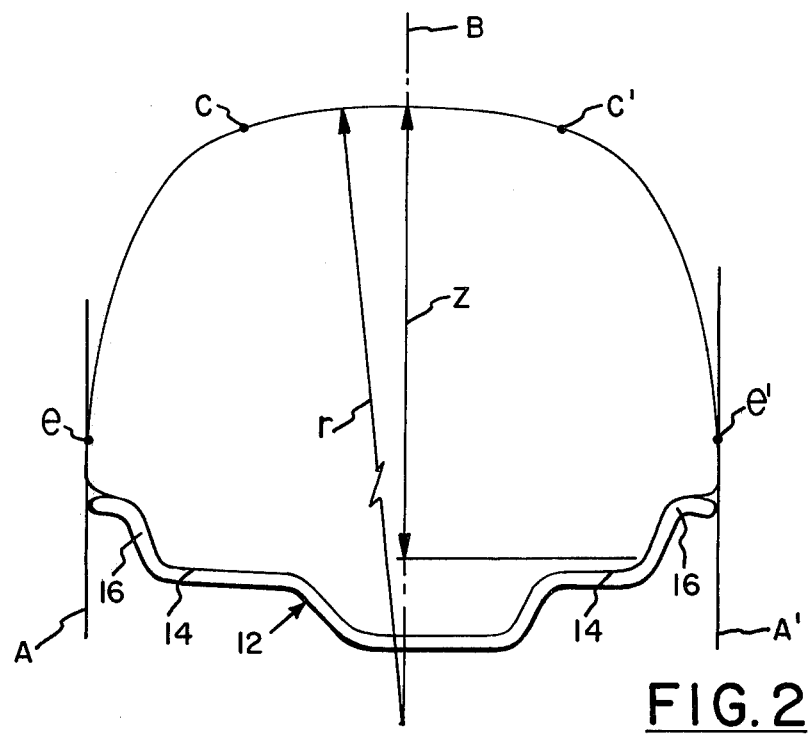
FIGS. 2, 3 and 4 are schematic representations of methods of determining the external profile of a tire according to the invention.

Referring next to FIG. 2, there is shown a schematic representation of a method of determining the external contour of a radial cross-section of a tire according to the invention, exclusive of indicia on the sidewalls or traction elements of the tread portion, when the tire is mounted upon a correspondingly sized rim 12 and inflated to its design inflation pressure, but not subjected to a load. The external contour of the portion of the tire disposed radially outwardly of the retaining flanges 16 of the rim 12 from the maximum outside diameter of the tread portion, at the mid-circumferential plane B of the tire, to the point of intersection $e, e^1$ of an external surface of each sidewall with a radially extending plane A,A$^1$ that is tangent to the axially outer edge of the respective retaining flange of the rim may be determined by the steps of:

(a) drawing a first pair of straight lines, A and A$^1$, both of which are perpendicular to the axis of rotation of said tire, line A being tangent to the axially outer extent of one of the retaining flanges of said rim and line A$^1$ being tangent to the axially outer extent of the other retaining flange of said rim;

(b) drawing a straight line B which is perpendicular to the axis of rotation of said tire and is located midway between lines A and A$^1$;

(c) striking a circle arc having a predetermined radius r with its center located on line B radially inwardly of the mounting surfaces of said rim, said circle arc being symmetrical with respect to line B and intersecting line B at a point located radially outwardly of the annular mounting surfaces 14 of the rim a distance Z equal to one-half of the difference between the maximum outside diameter of the tread portion of the tire and the nominal diameter of said mounting surfaces, the end of said circle arc located on the same side of line B as line A being point c and the end of said circle arc located on the same side of line B as line A$^1$ being point c$^1$, the axial distance between points c and c$^1$ being no more than one-half of the axial distance between lines A and A$^1$;

(d) locating a pair of points e,e$^1$, one of the points e of said pair being located on line A and the other point e$^1$ of said pair being located on line A$^1$, said pair of points e,e$^1$ being located radially outwardly of the radially outermost extent of said retaining flanges a distance no greater than one-half of the difference between the maximum outside diameter of the tread portion of the tire and the nominal diameter of mounting surfaces of the rim; and (e) drawing a pair of curved lines each of which at least approximates the curvature of an ellipse, one of said curved lines being tangent to the circle arc at point c and intersecting line A at point e, and the other curved line being tangent to the circle arc at point c$^1$ and intersecting line A$^1$ at point e$^1$.

Most preferably, the axial distance between the ends of the circle arc, points c and c$^1$, is no greater than four-tenths of the axial distance between the first pair of straight lines A,A$^1$, and the location of the points of intersection e,e$^1$ of the curved lines with the straight lins A,A$^1$ (which represent radially extending planes that are tangent to the axially outer edges of the retaining flanges) are located radially outwardly of the radially outermost extent of the retaining flanges a distance no greater than one-tenth of the difference between the maximum outside diameter of the tread portion of the tire and the nominal diameter of mounting surfaces of the rim.

As used herein and in the appended claims, an ellipse is a plane section of a right circular cone that is a closed curve other than a circle; or put another way, it is a closed plane curve generated by a point moving in such a way that the sum of its distances from two fixed points is a constant equal to the length of its major axis. The minor axis of an ellipse is a line perpendicular to the major axis that passes through a point on the major axis midway between the ends of the major axis. With reference to FIG. 2, the points c,c$^1$ at which the pair of curved lines are tangent to the circle arc are located either at an end of the major axis of an ellipse or axially outwardly and radially inwardly of the end of the major axis of an ellipse. In either case the major axis of the ellipse is parallel to the mid-circumferential plane B of the tire. The points e,e$^1$ at which the pair of curved lines intersect the radially extending lines A,A$^1$ that are tangent to the axially outer extents of the respective retaining flanges of the rim are located on or near the minor axis of the ellipse.

Figure 3:
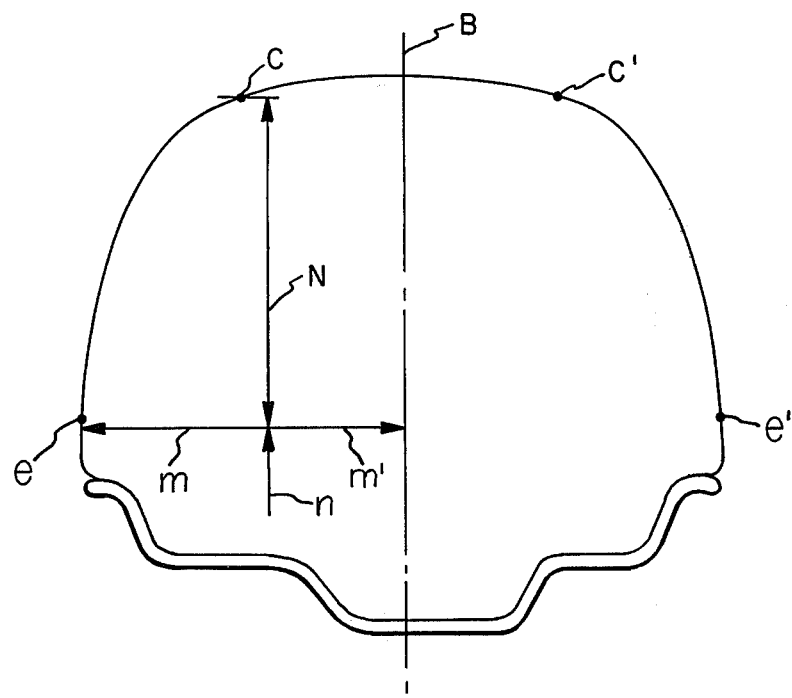

Referring to FIG. 3, there is illustrated a schematic representation of one method of determining a curved line that at least approximates the curvature of an ellipse on the external profile of a tire according to the invention. The mathematical equation for an elliptically curved line that is tangent to both an end c,c$^1$ of the circle arc and intersects a point e,e$^1$ on a radially extending line that is tangent to the axially outer extent of a retaining flange of a rim that the tire is mounted upon is:

$$\frac{(p-m)^2}{M^2} + \frac{(o-n)^2}{N^2} = 1$$

p being the axial distance from any point on the curve to the mid-circumferential plane B of the tire;

m being the axial distance from the major axis of the ellipse to the mid-circumferential plane of the tire;

M being ½ of the length of the minor axis of the ellipse;

o being the radial distance from any point on the curve to the axis of rotation of the tire;

n being the radial distance from the axis of rotation of the tire to the minor axis of the ellipse; and N being ½ of the length of the major axis of the ellipse.

The locations of the major and minor axes of the elliptically curved line extending from point c$^1$ to point e$^1$ are not shown in FIG. 3, but it is understood that the tire is symmetrical with respect to its mid-circumferential plane B.

It may be observed that in FIG. 3 the ends c,c$^1$ of the circle arc are not located on the major axes of the ellipses, and that the points of intersection e,e$^1$ of the curved lines with radially extending lines that are tangent to the axially outer edges of the respective flanges are not located on the minor axes of the ellipses. In the case where the ends c,c$^1$ of the circle arc are not located on the major axes of the ellipses, it is necessary that the major axes of the ellipses be located axially inwardly of and have an end located radially outwardly of the ends of the circle arc. However, it is understood that a tire according to the invention may have the ends c,c$^1$ of the circle arc located at the ends of the major axes of the ellipses, and/or the intersections e,e$^1$ of the curved lines with radially extending lines that are tangent to the axially outer extent of the rim flanges located on the minor axes of the ellipses without deviating from the invention.

There are several widely recognized graphic methods of approximating the curvature of an ellipse. For example, in A MANUAL OF ENGINEERING DRAWING FOR STUDENTS AND DRAFTSMEN, by French and Vierck, published by McGraw-Hill Book Company, copyright 1966, the graphic methods of approximating the curvature of an ellipse include: the "parallelogram method", the "eight-centered approximate ellipse", the "concentric circle method", and the "four-centered approximate ellipse". It is understood that for the purpose of describing and claiming the present invention a curved line "at least approximates the curvature of an ellipse" if each point on the curved line is disposed such that:

$$\frac{(p-m)^2}{M^2} + \frac{(o-n)^2}{N^2} = \text{between 0.95 and 1.05}$$

or is determined by any of the recognized graphic methods of approximating an ellipse, or even is determined using a commercially available template of an ellipse. However, the preferred method of determining the curved lines extending radially inwardly and axially outwardly from the ends of the circle arc in the profile of a tire according to the invention is what is commonly referred to in the mechanical drafting art as the "four-centered approximate ellipse".

Figure 4:
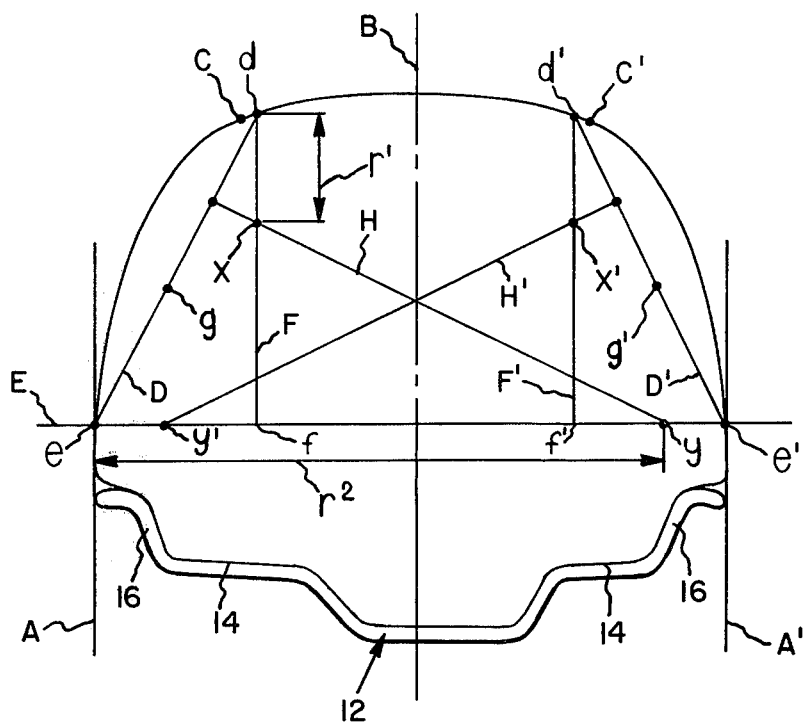

FIG. 4 is a schematic representation that may be referred to for an illustration of how the ends $c,c^1$ of the circle arc of FIG. 2 may be connected to the points, $e,e^1$ at which the external surfaces of the sidewalls intersect the radially extending lines $A,A^1$ that are tangent to the axially outer extent of the retaining flanges 16 of the rim 12 using the "four-centered approximate ellipse" method. In determining the preferred external contour of a tire according to this method, steps (a) through (d) are carried out as described above with respect to FIG. 2; however, with reference to FIG. 4, the first and second curved lines drawn in step (e), each of which at least approximates the curvature of an ellipse, are determined by the following steps:

(i) drawing a second pair of straight lines, D and $D^1$, line D extending from a point d located at one end of the major axis of an ellipse to point e and line $D^1$ extending from a point $d^1$ located at one end of the major axis of another ellipse to point $e^1$, points d and $d^1$ being either coincident with the ends of the circle arc or located axially inwardly and radially outwardly of the ends of the first circle arc;

(ii) drawing a straight line E that is parallel to the axis of rotation of said tire and intersects points e and $e^1$;

(iii) drawing a third pair of straight lines, F and $F^1$, line F extending from point d to line E and intersecting line E at point f, line $F^1$ extending from point $d^1$ to line E and intersecting line E at point $f^1$, lines F and $F^1$ being perpendicular to line E;

(iv) locating a point g on line D and a point $g^1$ on line $D^1$, point g being located at a distance from point e that is equal to the difference between the length of line F and the length of the segment of line E extending from point f to point e, point $g^1$ being located at a distance from point $e^1$ that is equal to the difference between the length of line $F^1$ and the length of the segment of line E extending from point $e^1$ to point $f^1$;

(v) drawing a fourth pair of straight lines, H and $H^1$, line H being perpendicular to line D and intersecting line D midway between point d and point g, line H being projected to intersect line F at point x and line E at point y, line $H^1$ being perpendicular to line $D^1$ and intersecting line $D^1$ midway between point $d^1$ and point $g^1$, line $H^1$ being projected to intersect line $F^1$ at point $x^1$ and line E at point $y^1$; and (vi) striking a first pair of circle arcs and a second pair of circle arcs, each of the circle arcs of said first pair having a radius $r^1$ and each of the circle arcs of said second pair having a radius $r^2$, one of the circle arcs of said first pair having a center located at point x and the other circle arc of said first pair having a center located at point $x^1$, one of the circle arcs of said second pair having a center located at point y and the other circle arc of said second pair having a center located at point $y^1$, radius $r^1$ being equal to the distance from point x to point d as measured along line F and radius $r^2$ being equal to the distance from point y to point e as measured along line E, each circle arc of said first pair of circle arcs extending from point c or point $c^1$, respectively, to a point where it intersects one of the circle arcs of said second pair of circle arcs, and each circle arc of said second pair of circle arcs extending from point e or point $e^1$, respectively, to the point where it intersects one of the circle arcs of said first pair of circle arcs.

The ends of the circle arc drawn in step (c), sometimes referred to in the tire art as the tread arc, of a tire according to the invention that has been mounted upon its designated rim and inflated to its design inflation pressure but not subject to a load, may be determined by matingly placing a template of an arc having the same diameter as the tread arc on the external surface of the tread portion of the tire. The points at which the external surface of each sidewall intersect a radially extending plane that is tangent to the axially outer edge of the respective flange of the rim may be located using a straight edge, for example a meter stick, of sufficient length to be placed against the edge of the flange in two locations and marking the radially outermost location at which the sidewall contacts the straight edge. The contour of the curved surface of each sidewall extending between the edge of the first drawn circle arc and the intersection of the surface with the radially extending plane that is tangent to the axially outer edge of the rim flange may be ascertained using a profilometer.

For example, in a passenger car tire size P155/75-16 according to the invention, having a tread portion with a maximum outside diameter of 63.50 centimeters (25 inches), which is intended to be mounted upon a rim having mounting surfaces with a nominal diameter of 40.64 centimeters (16 inches), and an axial distance of 15.75 centimeters (6.2 inches) between the axially outer extends of the retaining flanges, the tread arc should intercept the mid-circumferential plane of the tire (line B) at a point 11.43 centimeters (4.5 inches) radially outward of the nominal diameter of the mounting surfaces. The radius r of the circle arc is 25.4 centimeters (10 inches), and the axial distance between the ends of the tread arc $c,c^1$ is 5.89 centimeters (2.32 inches); or in other words each end $c,c^1$ of the tread arc is located 2.945 centimeters (1.16 inches) from the mid-circumferential plane (line B) of the tire. The points $e,e^1$ at which the curved external surfaces of the sidewalls are tangent to the radially extending lines $A,A^1$ that are tangent to the axially outer extent of the retaining flanges are located 0.68 centimeters (0.27 inches) radially outwardly of the radially outer extent of the retaining flanges of the rim. Of course, all of these dimensions are measured with the tire mounted on the rim and inflated to its design inflation pressure, and not subjected to a load. By way of example only, a conventionally-shaped P185/75-14 tire is mountable upon a smaller diameter rim of the same width but has approximately the same maximum outside diameter at its mid-circumferential plane as a P155/75-16 tire according to the invention. However, the conventionally-shaped tire typically has a maximum axial width of about 18.42 centimeters (7.25 inches) as compared to a maximum axial width of 15.75 centimeters (6.2 inches) for a tire according to the invention. The tire according to the invention is about 14 percent narrower than the conventional tire, which is a further contribution to its improved aerodynamic characteristics. It is believed that while a conventionally-shaped P185/75-14 radial tire typically has a design inflation pressure of about 241,316 pascals (35 pounds per square inch) to support a load of 363 kilograms (800 pounds), a P155/75-16 radial tire according to the invention has a design inflation pressure of about 310,264 pascals (45 pounds per square inch) to support the same load. It is also believed that this higher design inflation pressure will help to give a tire according to the invention a reduced rolling resistance.

Figure 5:
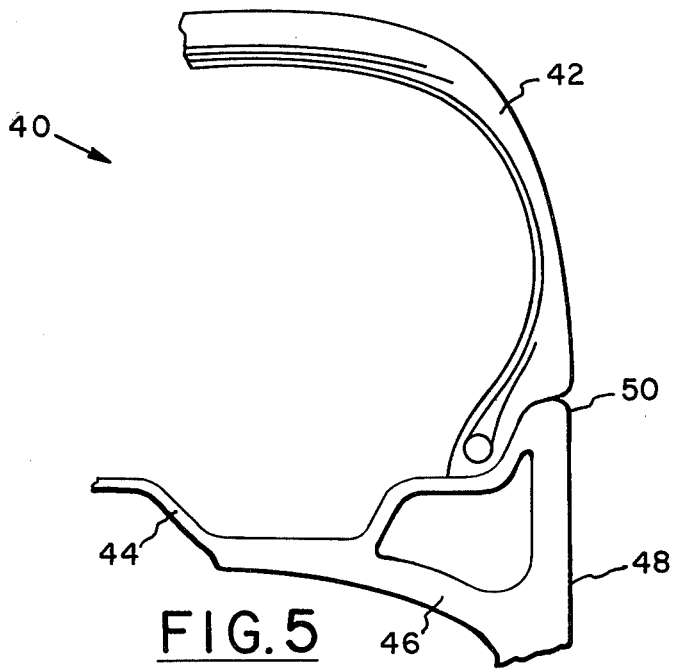
FIGS. 5 and 6 are fragmentary radial cross-sectional views of tires according to the invention in combination with various structures that enhance the aerodynamic characteristics of a tire and rim assembly.
Figure 6:
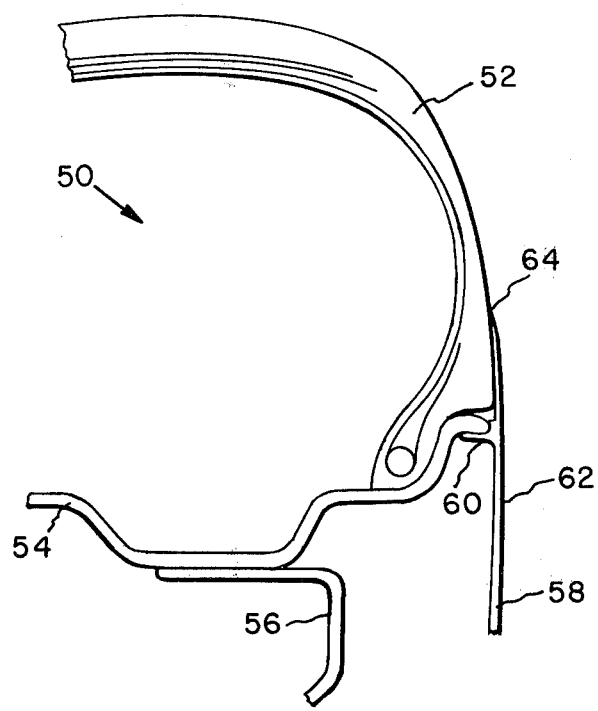

FIGS. 5 and 6 are fragmentary radial cross-sectional views of pneumatic tires according to the invention mounted upon rims to form assemblies. In addition to the tire and rim structures illustrated in FIGS. 1 through 4, as described above, the assemblies shown in FIGS. 5 and 6 are further comprised of components that further enhance the aerodynamic characteristics of the assemblies.

The assembly 40 illustrated in FIG. 5 comprises a pneumatic tire 42 according to the invention mounted upon a rim 44 in the manner described above. This particular assembly further comprises a wheel means 46 is coaxial with and disposed radially inwardly of the rim, and is attached thereto by means for attachment such as welding. The wheel means has a radially extending flat disc surface 48 that lies in substantially the same radial plane as the axially outer edge 50 of one of the retaining flanges of the rim. Naturally, the flat disc surface of the wheel should be disposed outwardly of the assembly with respect to a vehicle which the assembly is used to support.

The assembly 50 illustrated in FIG. 6 comprises a pneumatic tire 52 according to the invention mounted upon a rim 54 in the manner described above. A wheel means 56 is coaxial with and disposed radially inwardly of the rim, and is attached thereto by means for attachment, such as welding. The assembly further comprises a wheel cover 58, sometimes referred to as a fairing, which is coaxial with the assembly. The wheel cover is disposed at an axial end of the rim and is attached thereto by a means for attachment 60 such as clips. The wheel cover 58 comprises a radially extending circular surface 62 that is convex with respect to an axial end of the assembly. The convex surface 62 of the wheel cover has a circumferential edge 64 that is located at least the same radial distance from the axis of rotation of the assembly as the intersections of the sidewalls of the tire with a radially extending line that is tangent to the axially outer edge of a retaining flange (points e and $e^1$ of FIGS. 1, 2, and 3). Preferably, the convex surface of the wheel cover is a continuation of the curvature of the external surface of a sidewall of the tire. When the assembly is used to support a vehicle, the convex surface of the wheel cover is disposed outwardly of the assembly with respect to the vehicle.

While certain representative embodiments and details have been shown and described for the purpose of illustrating the invention, it will be apparent to those skilled in the art that various changes and modifications may be made therein without departing from the spirit or scope of the invention.

What is claimed is:

1. A pneumatic tire that is mountable upon a correspondingly sized rim having retaining flanges at each axial end thereof, said tire comprising a circumferentially extending tread portion with a sidewall extending radially inwardly from each axial edge of the tread portion to an annular bead portion that is disposed adjacent to a retaining flange when the tire is mounted upon said rim; a radial cross section of said tire having an external contour on each side of its mid-circumferential plane, when the tire is mounted upon said rim and inflated to its design inflation pressure but not subjected to a load, exclusive of indicia on the sidewalls or traction elements of the tread, that extends continuously axially outwardly and radially inwardly from said mid-circumferential plane to the point of intersection of an external surface of each sidewall with a radially extending line that is tangent to the axially outer edge of the respective retaining flange of said rim, said tread portion having a first radius of curvature and a portion of the external contour of each sidewall at least approximating the curvature of an ellipse, and no point on the external surface of either sidewall is disposed axially outwardly of the axially outer edge of the respective retaining flange of said rim a distance greater than two percent of the axial distance between the axially outer edges of the retaining flanges of said rim.

2. A pneumatic tire suitable for mounting upon a rim having a pair of axially spaced apart annular mounting surfaces, with a predetermined nominal diameter, and a retaining flange adjacent to each mounting surface, said tire comprising a circumferentially extending tread portion having a maximum outside diameter at the mid-circumferential plane of the tire and a sidewall extending radially inwardly from each axial edge of the tread portion, a radial cross-section of the portion of said tire that is disposed radially outwardly of the retaining flanges of said rim when said tire is mounted upon said rim and inflated to its design inflation pressure, but not subjected to a load, having an external contour on each side of said mid-circumferential plane, exclusive of indicia on the sidewalls or traction elements of said tread portion, from said maximum outside diameter to the intersection of an external surface of each sidewall with a radially extending line that is tangent to the axially outer edge of the respective retaining flange that is substantially determined by the steps of:

(a) drawing a first pair of straight lines, A and $A^1$, both of which are perpendicular to the axis of rotation of said tire, line A being tangent to the axially outer extent of one of the retaining flanges of said rim and line $A^1$ being tangent to the axially outer extent of the other retaining flange of said rim;

(b) drawing a straight line B which is perpendicular to the axis of rotation of said tire and is located midway between lines A and $A^1$;

(c) striking a circle arc having a predetermined radius r with its center located on line B radially inwardly of the mounting surfaces of said rim, said circle arc being symmetrical with respect to line B and intersecting line B at a point located radially outwardly of said mounting surfaces a distance equal to one-half of the difference between the maximum outside diameter of the tread portion of the tire and the nominal diameter of said mounting surfaces, the end of said circle arc located on the same side of line B as line A being point c, and the end of said circle arc located on the same side of line B as line $A^1$ being point $c^1$, the axial distance between points c and $c^1$ being no more than one-half of the axial distance between lines A and $A^1$; and (d) locating a pair of points $e,e^1$, one of the points e of said pair being located on line A and the other point $e^1$ of said pair being located on line $A^1$, said pair of points $e,e^1$ being located radially outwardly of the radially outermost extent of said retaining flanges a distance no greater than one-half of the difference between the maximum outside diameter of the tread portion of the tire and the nominal diameter of mounting surfaces of the rim; and (e) drawing a pair of curved lines each of which at least approximates the curvature of an ellipse, one of said curved lines being tangent to the circle arc at point c and intersecting line A at point e, and the other curved line being tangent to the circle arc at point $c^1$ and intersecting line $A^1$ at point $e^1$;

and no point on the external surface of either sidewall is disposed axially outwardly of the axially outer extent of the respective retaining flange of said rim a distance greater than two percent of the axial distance between the axially outer extents of the retaining flanges of said rim.

3. A pneumatic tire as described in claim 2 wherein the axial distance between points c and $c^1$ is no more than four-tenths of the axial distance between lines A and $A^1$.

4. A pneumatic tire as described in claim 2 wherein points e and $e^1$ are located radially outwardly of the radially outermost extent of said retaining flanges a distance no greater than one-tenth of the difference between the maximum outside diameter of the tread portion of the tire and the nominal diameter of the mounting surfaces of the rim.

5. A pneumatic tire as described in claim 3 wherein points e and $e^1$ are located radially outwardly of the outermost extent of said retaining flanges a distance no greater than one-tenth of the difference between the maximum outside diameter of the tread portion of the tire and the nominal diameter of the mounting surfaces of the rim.

6. A pneumatic tire as described in claim 2 wherein points e and $e^1$ are not located very close to the radially outer extent of the retaining flanges of said rim, the external surface of each of the sidewalls of said tire extending radially inwardly from point e or $e^1$, respectively, to a point that is very close to the radially outer extent of the respective retaining flange of said rim in a direction that varies no greater than 15° from line A or $A^1$, respectively.

7. A pneumatic tire as described in claim 4 wherein points e and $e^1$ are not located very close to the radially outer extent of the retaining flanges of said rim, the external surface of each of the sidewalls of said tire extending radially inwardly from point e or $e^1$, respectively, to a point that is very close to the radially outer extent of the respective retaining flange of said rim in a direction that varies no greater than 15° from line A or $A^1$, respectively.

8. A pneumatic tire as described in claim 5 wherein points e and $e^1$ are not located very close to the radially outer extent of the retaining flanges of said rim, the external surface of each of the sidewalls of said tire extending radially inwardly from point e or $e^1$, respectively, to a point that is very close to the radially outer extent of the respective retaining flange of said rim in a direction that varies no greater than 15° from line A or $A^1$, respectively.

9. A pneumatic tire as described in any one of claims 2 through 8 wherein each point on each of the curved lines drawn in step (e) is disposed such that:

$$\frac{(p-m)^2}{M^2} + \frac{(o-n)^2}{N^2} = \text{between 0.95 and 1.05}$$

p being the axial distance from any point on the curve to the mid-circumferential plane B of the tire;

m being the axial distance from the major axis of the ellipse to the mid-circumferential plane of the tire;

M being $\frac{1}{2}$ of the length of the minor axis of the ellipse;

o being the radial distance from any point on the curve to the axis of rotation of the tire;

n being the radial distance from the axis of rotation of the tire to the minor axis of the ellipse; and N being $\frac{1}{2}$ of the length of the major axis of the ellipse.

10. A pneumatic tire as described in any of one of claims 2 through 8 wherein the curved lines drawn in step (e) are determined by the following steps:

(i) drawing a second pair of straight lines, D and $D^1$, line D extending from a point d located at one end of the major axis of an ellipse to point e and line $D^1$ extending from a point $d^1$ located at one end of the major axis of another ellipse to point $e^1$, points d and $d^1$ being either coincident with the ends of the circle arc or located axially inwardly and radially outwardly of the ends of the circle arc;

(ii) drawing a straight line E that is parallel to the axis of rotation of said tire and intersects points e and $e^1$;

(iii) drawing a third pair of straight lines, F and $F^1$, line F extending from point d to line E and intersecting line E at point f, line $F^1$ extending from point $d^1$ to line E and intersecting line E at point $f^1$, lines F and $F^1$ being perpendicular to line E;

(iv) locating a point g on line D and a point $g^1$ on line $D^1$, point g being located at a distance from point e that is equal to the difference between the length of line F and the length of the segment of line E extending from point f to point e, point $g^1$ being located at a distance from point $e^1$ that is equal to the difference between the length of line $F^1$ and the length of the segment of line E extending from point $e^1$ to point $f^1$;

(v) drawing a fourth pair of straight lines, H and $H^1$, line H being perpendicular to line D and intersecting line D midway between point d and point g, line H being projected to intersect line F at point x and line E at point y, line $H^1$ being perpendicular to line $D^1$ and intersecting line $D^1$ midway between point $d^1$ and point $g^1$, line $H^1$ being projected to intersect line $F^1$ at point $x^1$ and line E at point $y^1$; and (vi) striking a first pair of circle arcs and a second pair of circle arcs, each of the circle arcs of said first pair having a radius $r^1$ and each of the circle arcs of said second pair having a radius $r^2$, one of the circle arcs of said first pair having a center located at point x and the other circle arc of said first pair having a center located at point $x^1$, one of the circle arcs of said second pair having a center located at point y and the other circle arc of said second pair having a center located at point $y^1$, radius $r^1$ being equal to the distance from point x to point d as measured along line F and radius $r^2$ being equal to the distance from point y to point e as measured alone line E, each circle arc of said first pair of circle arcs extending from point c or point $c^1$, respectively, to a point where it intersects one of the circle arcs of said second pair of circle arcs, and each circle arc of said second pair of circle arcs extending from point e or point $e^1$, respectively, to the point where it intersects one of the circle arcs of said first pair of circle arcs.

11. A pneumatic tire as described in claim 10 wherein point c is coincident with point d, and point $c^1$ is coincident with point $d^1$.

12. The assembly of a pneumatic tire and a rim; said rim comprising a pair of axially spaced apart annular mounting surfaces with a predetermined nominal diameter, and a retaining flange adjacent to each mounting surface; said pneumatic tire comprising a circumferentially extending tread portion having a maximum outside diameter at the mid-circumferential plane of the tire and a sidewall extending radially inwardly from each axial edge of the tread portion to an annular bead porton, each bead portion being mounted upon one of the mounting surfaces of said rim and adjacent to the respective retaining flange, said tire being inflated to its design inflation pressure, but not subject to a load; a radial cross-section of the portion of said assembly that is disposed radially outwardly of the retaining flanges of said rim having an external contour on each side of said mid-circumferential plane, exclusive of indicia on the sidewalls or traction elements of said tread portion, from said maximum outside diameter to the intersection of an external surface of each sidewall with a radially extending line that is tangent to the axially outer edge of the respective retaining flange that is substantially determined by the steps of:

(a) drawing a first pair of straight lines, A and $A^1$, both of which are perpendicular to the axis of rotation of said tire, line A being tangent to the axially outer extent of one of the retaining flanges of said rim and line $A^1$ being tangent to the axially outer extent of the other retaining flange of said rim;

(b) drawing a straight line B which is perpendicular to the axis of rotation of said tire and is located midway between lines A and $A^1$;

(c) striking a circle arc having a predetermined radius r with its center located on line B radially inwardly of the mounting surfaces of said rim, said circle arc being symmetrical with respect to line B and intersecting line B at a point located radially outwardly of said mounting surfaces a distance equal to one-half of the difference between the maximum outside diameter of the tread portion of the tire and the nominal diameter of said mounting surfaces, the end of said circle arc located on the same side of line B as line A being point c, and the end of said circle arc located on the same line of line B as line $A^1$ being point $c^1$, the axial distance between points c and $c^1$ being no more than one-half of the axial distance between lines A and $A^1$; and (d) locating a pair of points e,$e^1$, one of the points e of said pair being located on line A and the other point $e^1$ of said pair being located on line $A^1$, said pair of points e,$e^1$ being located radially outwardly of the radially outermost extent of said retaining flanges a distance no greater than one-half of the difference between the maximum outside diameter of the tread portion of the tire and the nominal diameter of mounting surfaces of the rim; and (e) drawing a pair of curved lines each of which at least approximates the curvature of an ellipse, one of said curved lines being tangent to the circle arc at point c and intersecting line A at point e, and the other curved line being tangent to the circle arc at point $c^1$ and intersecting line $A^1$ at point $e^1$;

and no point on the external surface of either sidewall is disposed axially outwardly of the axially outer extent of the respective retaining flange of said rim a distance greater than two percent of the axial distance between the axially outer extents of the retaining flanges of said rim.

13. The assembly of a pneumatic tire and a rim as described in claim 12 which further comprises a wheel means coaxial with and disposed radially inwardly of said rim and attached thereto by means for attachment, said wheel means having a radially extending flat disc surface that lies in substantially the same radial plane as the axially outer edge of one of the retaining flanges of said rim.

14. The assembly of a pneumatic tire and a rim as described in claim 12, said assembly further comprising a wheel cover, said wheel cover being coaxial with said assembly and being disposed at an axial end of said rim and attached thereto by means for attachment, said wheel cover comprising a radially extending surface that is convex with respect to an axial end of said assembly, and the convex surface of said wheel cover having a circumferential edge located at least the same radial distance from the axis of rotation of said assembly as points e and $e^1$.

15. The assembly of a pneumatic tire and a rim as described in claim 14 wherein the convex surface of said wheel cover is a continuation of the curvature of the external surface of a sidewall of said tire.

* * * * *

UNITED STATES PATENT AND TRADEMARK OFFICE
CERTIFICATE OF CORRECTION

PATENT NO. : 4,434,830
DATED : March 6, 1984
INVENTOR(S) : Samuel P. Landers and William E. Egan It is certified that error appears in the above-identified patent and that said Letters Patent are hereby corrected as shown below:

In column 4, line 37, "extends" should be -- extents -- .
In column 4, line 48, "lins" should be -- lines -- .
In column 8, line 44, "extends" should be -- extents -- .
In column 10, line 65, "are" should be -- arc -- .

Signed and Sealed this

Twenty-third Day of October 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,434,830
DATED      : March 6, 1984
INVENTOR(S): Samuel P. Landers and William E. Egan It is certified that error appears in the above-identified patent and that said Letters Patent is hereby corrected as shown below:

Column 4, line 37, "extends" should be -- extents --.
Column 5, line 48, "lins" should be -- lines --.
Column 8, line 44, "extends" should be -- extents --.
Column 10, line 65, "are" should be -- arc --.

This certificate supersedes certificate of correction issued October 23, 1984.

Signed and Sealed this

Twenty-second Day of October 1985

[SEAL]

Attest:

Attesting Officer

DONALD J. QUIGG

Commissioner of Patents and Trademarks—Designate